(12) United States Patent
Boice

(10) Patent No.: US 7,381,019 B1
(45) Date of Patent: Jun. 3, 2008

(54) ACCESSORY FOR LOADING AND TRANSPORTING A MOTORCYCLE

(75) Inventor: Art Boice, Lake Katrine, NY (US)

(73) Assignee: Automatic Equipment Manufacturing Company, Pender, NE (US)

( * ) Notice: Subject to any disclaimer, the term of this patent is extended or adjusted under 35 U.S.C. 154(b) by 225 days.

(21) Appl. No.: 11/393,979

(22) Filed: Mar. 30, 2006

Related U.S. Application Data

(60) Provisional application No. 60/667,548, filed on Apr. 1, 2005.

(51) Int. Cl.
*B60P 3/06* (2006.01)
(52) U.S. Cl. ......................................................... 410/3
(58) Field of Classification Search .................... 410/3, 410/4, 7, 8, 9, 19; 14/69.5; 296/51
See application file for complete search history.

(56) References Cited

U.S. PATENT DOCUMENTS

| | | | | |
|---|---|---|---|---|
| 4,239,438 A | * | 12/1980 | Everson | 414/462 |
| 4,274,788 A | * | 6/1981 | Sutton | 414/462 |
| 4,453,878 A | * | 6/1984 | Paukku | 414/491 |
| 4,455,118 A | * | 6/1984 | Scharf | 414/494 |
| 4,932,829 A | | 6/1990 | Miller | |
| 5,213,466 A | * | 5/1993 | Bubik | 414/494 |
| 5,380,141 A | * | 1/1995 | Flowers | 414/462 |
| 5,556,249 A | * | 9/1996 | Heine | 414/500 |
| 5,603,600 A | * | 2/1997 | Egan et al. | 414/462 |
| 5,620,296 A | * | 4/1997 | McMahon et al. | 414/498 |
| 5,707,203 A | * | 1/1998 | Richter | 414/812 |
| 5,730,577 A | | 3/1998 | Jones | |
| 5,846,047 A | * | 12/1998 | Riekki | 414/494 |
| 5,934,863 A | * | 8/1999 | Beck | 414/538 |
| 6,089,816 A | * | 7/2000 | Christ | 414/538 |
| 6,099,232 A | * | 8/2000 | Dixon et al. | 414/494 |
| 6,149,372 A | * | 11/2000 | Lee et al. | 414/538 |
| 6,176,672 B1 | * | 1/2001 | Egan et al. | 414/462 |
| 6,352,401 B1 | | 3/2002 | LeMay | |
| 6,354,777 B1 | * | 3/2002 | Riekki | 410/3 |
| 6,357,991 B1 | * | 3/2002 | Hamlett | 414/538 |
| 6,413,033 B1 | | 7/2002 | Monroig, Jr. | |
| 6,536,822 B1 | | 3/2003 | Vagedes et al. | |
| 6,561,746 B1 | | 5/2003 | Broussard et al. | |
| 6,634,849 B2 | | 10/2003 | Clary | |
| 6,682,292 B2 | | 1/2004 | Estes | |
| 6,695,565 B1 | | 2/2004 | Franchuk | |
| 6,705,820 B2 | | 3/2004 | Schilling | |
| D495,107 S | | 8/2004 | Thurm | |
| 6,827,543 B2 | | 12/2004 | O'Neil | |
| 6,884,018 B1 | | 4/2005 | Dugan et al. | |
| 6,913,304 B1 | | 7/2005 | Sweet | |
| 6,935,619 B2 | | 8/2005 | Chamoun | |
| 6,966,542 B2 | | 11/2005 | Bettencourt | |
| 7,004,454 B2 | | 2/2006 | Petrone et al. | |
| 7,300,239 B2 | * | 11/2007 | Benedikt | 414/546 |

\* cited by examiner

*Primary Examiner*—H Gutman
(74) *Attorney, Agent, or Firm*—Donald R. Schoonover

(57) ABSTRACT

An accessory for a transporting vehicle having a bed and a tailgate mounting mechanism, a ramp with a main portion and at least one extension, a mounting mechanism for pivotally mounting the ramp, a sled mechanism slidably mounted to the ramp; a drive mechanism with a motor mechanism for displacing the sled mechanism along the ramp, a clamping mechanism for releasably securing a wheel of a motorcycle to the sled mechanism, and a power source. The accessory has a loading configuration wherein the ramp forms an inclined plane and a transporting configuration wherein the ramp is oriented substantially parallel to the bed of the transporting vehicle.

13 Claims, 4 Drawing Sheets

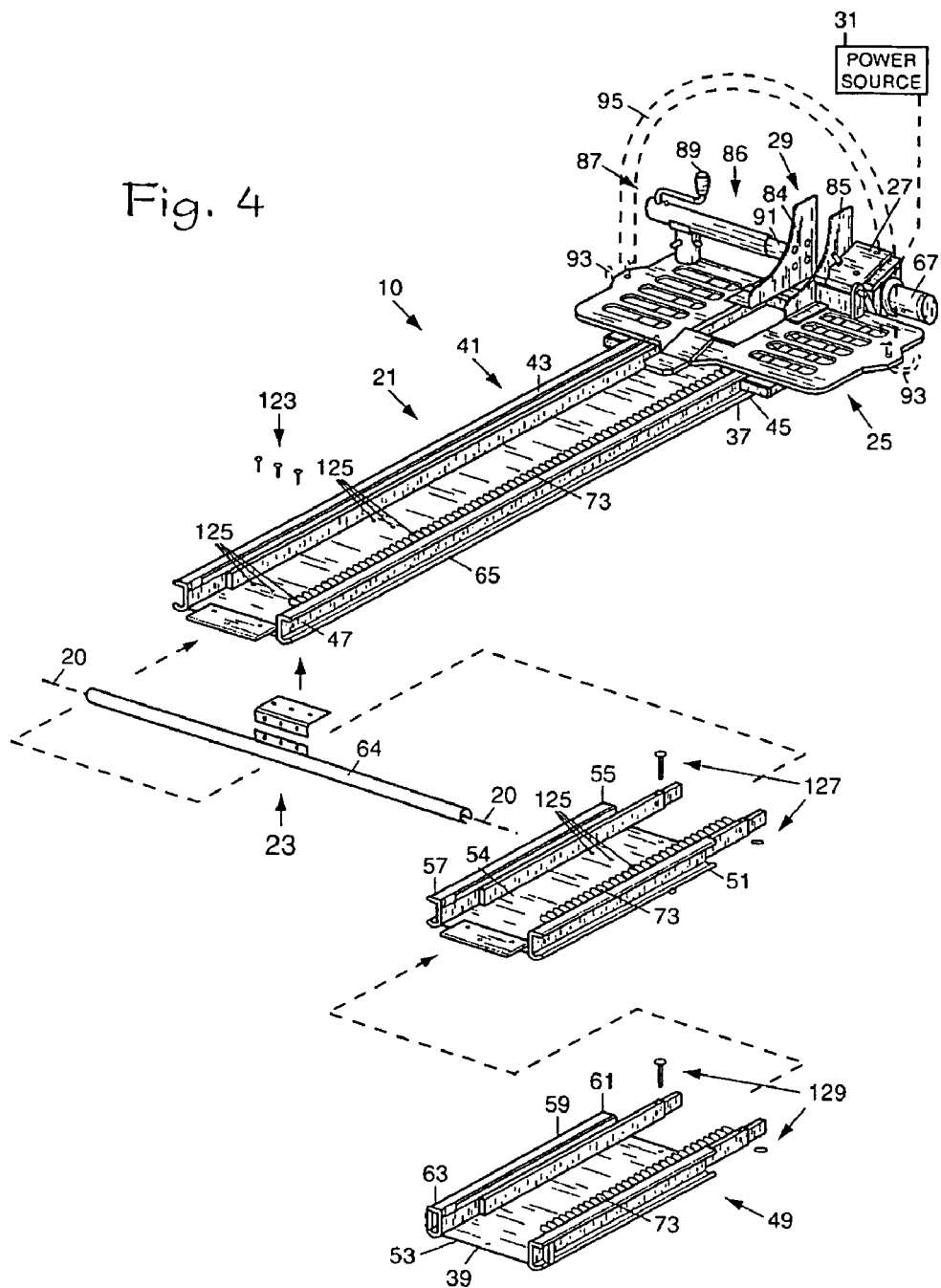

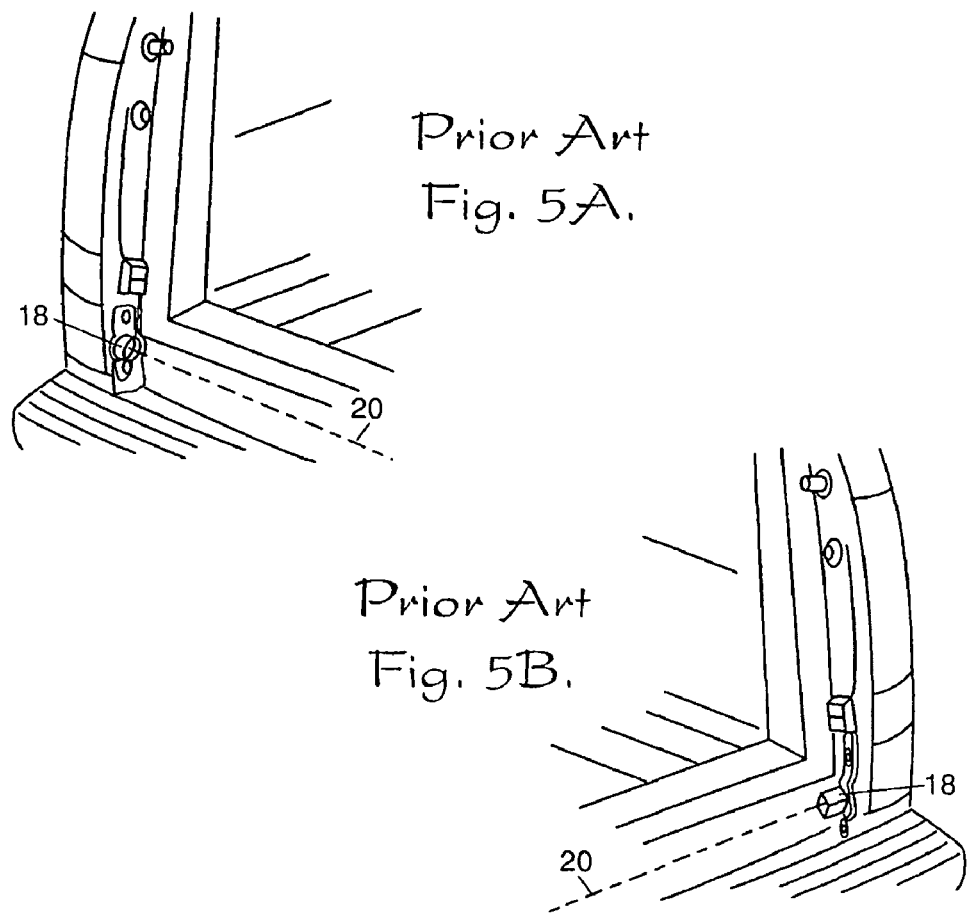
Prior Art
Fig. 5A.
Prior Art
Fig. 5B.
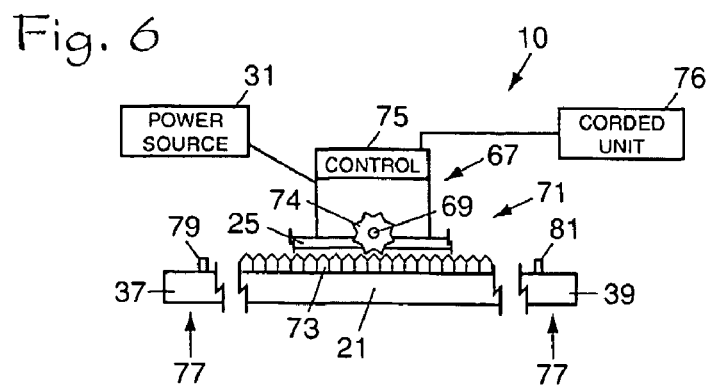
Fig. 6

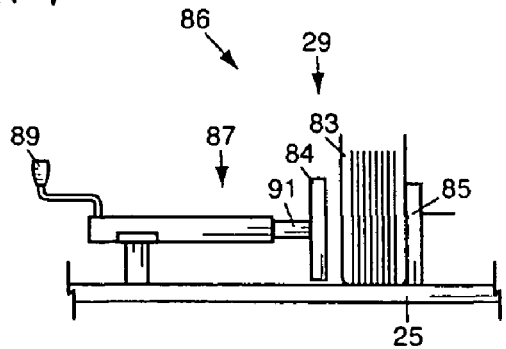
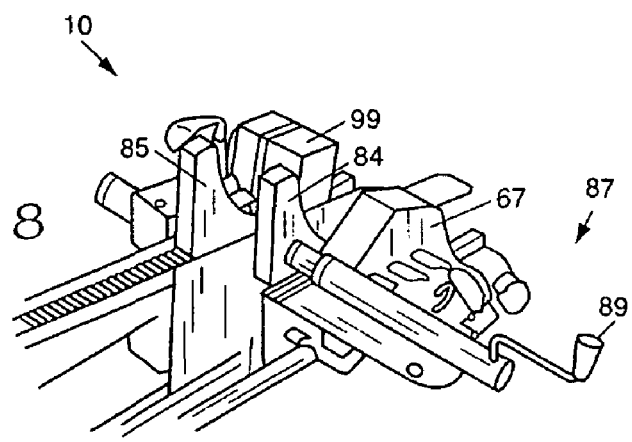

ACCESSORY FOR LOADING AND TRANSPORTING A MOTORCYCLE

CROSS REFERENCE TO RELATED APPLICATIONS

This application claims priority of Provisional Patent Application No. 60/667,548, entitled MOTORCYCLE RAMP and filed Apr. 1, 2005, which is incorporated herein by reference in its entirety.

BACKGROUND OF THE INVENTION

1. Field of the Invention

The present invention relates to accessories for motor vehicles and, more specifically without limitation, to accessories for transporting a motorcycle.

2. Description of the Related Art

Motorcycles are now commonplace in the everyday lives on many individuals. From time to time, a motorcycle must be moved from one location to another location wherein it is impractical or impossible to move the motorcycle without employing a larger vehicle for transportation purposes.

Unfortunately, the weight and bulkiness of a motorcycle makes loading and unloading thereof onto a transporting vehicle an unwieldy and ominous task, sometimes requiring the combined effort of several strong and husky individuals.

What is needed is an accessory which enables an individual, working alone, to load a motorcycle onto a transporting vehicle and also, while working alone, to unload the motorcycle from the transporting vehicle.

SUMMARY OF THE INVENTION

The improvements of the accessory for a transporting vehicle, having a bed and a tailgate mounting mechanism for pivotally mounting a tailgate about a transversely oriented horizontal axis, of the present invention include a ramp, a mounting mechanism pivotally mounting the ramp to the tailgate mounting mechanism for rotation about the transversely oriented horizontal axis, a sled mechanism slidably mounted on the ramp, a drive mechanism for displacing the sled mechanism along the ramp, a clamping mechanism for clamping a wheel of the motorcycle to the sled mechanism, and a power source.

The ramp, which has an upwardly opening C-shaped configuration extending the length of the ramp, includes a main portion and one or more extensions releasably securable to the main portion in an end-to-end relationship.

The drive mechanism includes a motor mechanism mounted on the sled mechanism with the motor mechanism including a drive shaft; a rack and pinion arrangement wherein the rack is fixedly secured and arranged lengthwise along the ramp, and the pinion is fixedly secured to the drive shaft of the motor mechanism; a control mechanism for selectively activating and deactivating the motor mechanism; a forward limiting mechanism connected to the motor mechanism to limit the extent to which the sled mechanism is displaceable toward a front end of the ramp; and a rearward limiting mechanism connected to the motor mechanism to limit the extent to which the sled mechanism is displaceable toward a rear end of the ramp.

The clamping mechanism may include a displacer to manually and frictionally clamp a wheel of the vehicle to be transported between two opposing, generally vertically oriented plates.

The accessory has a loading configuration wherein the ramp forms an inclined plane, and a transporting configuration wherein the ramp is oriented substantially parallel to the bed of the transporting vehicle, and wherein the accessory is displaceable to and from the loading configuration and the transporting configuration by the weight of a motorcycle being displaced along the ramp as it is being loaded thereon.

PRINCIPAL OBJECTS AND ADVANTAGES OF THE INVENTION

The principal objects and advantages of the present invention include: providing an accessory which enables a lone individual to load a motorcycle onto a transporting vehicle; providing such an accessory which enables a lone individual to unload a motorcycle from a transporting vehicle; and generally providing such an accessory that is reliable in performance, that is capable of long-lasting life, and that is particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 4 is an enlarged and exploded, perspective view of the accessory for loading and transporting a motorcycle on a transporting vehicle.

FIGS. 5A and 5B show examples of existing tailgate mounting mechanisms for pivotally mounting a tailgate about a transversely oriented horizontal axis of a transporting vehicle.

FIG. 6 is a partial schematic representation of the accessory for loading and transporting a motorcycle on a transporting vehicle.

FIG. 7 is a schematic representation of a clamping mechanism of the accessory for loading and transporting a motorcycle on a transporting vehicle.

FIG. 8 is a fragmentary and perspective view of a battery mounted on a sled mechanism of the for loading and transporting a motorcycle on a transporting vehicle, in accordance with the present invention.

DETAILED DESCRIPTION OF THE INVENTION

Figure 1:
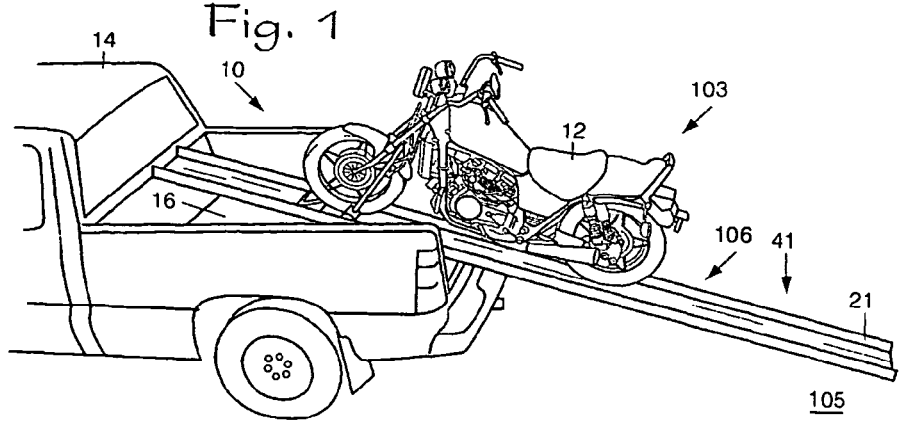
FIG. 1 is perspective view showing an accessory for loading and transporting a motorcycle in a loading configuration, in accordance with the present invention.

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to an accessory for accessory for loading and transporting a motorcycle 12 on a transporting vehicle 14 having a bed 16 and a tailgate mounting mechanism 18 for pivotally mounting a tailgate about a transversely oriented horizontal axis 20 (see examples in FIGS. 5A and 5B) in accordance with the present invention, as shown in FIGS. 1 through 8. The accessory 10 includes a ramp 21, a mounting mechanism 23, a sled mechanism 25, a drive mechanism 27, a clamping mechanism 29, and a power source 31.

The ramp 21 has a front end 37, a rear end 39, and an upwardly opening C-shaped configuration 41 extending from the front end 37 to the rear end 39. The ramp 21 includes a main portion 43 having a main front end 45 and a main rear end 47, and an extension portion 49 having a extension front end 51 and an extension rear end 53, wherein the extension portion 49 is releasably securable to the main portion 43 with the extension portion 49 being oriented in an end-to-end relationship with the main portion 43, as shown in FIG. 1.

The extension portion 49 may include a center extension 54 having a center extension front end 55 and a center extension rear end 57 wherein the center extension 54 is releasably securable to the main portion 43 with the center extension 54 being oriented in an end-to-end relationship with the main portion 43. The extension portion 49 may also include an end extension 59 having an end extension front end 61 and an end extension rear end 63 wherein the end extension 59 is releasably securable to the center extension 54 with the end extension 59 being oriented in an end-to-end relationship with the center extension 54.

The mounting mechanism 23 is structured and configured to pivotally mount the ramp 21 to the tailgate mounting mechanism 18 for rotation about the transversely oriented horizontal axis 20. The mounting mechanism 23 generally includes a pivot element 64 fixedly secured to an underside 65 of the ramp 21.

The sled mechanism 25 is slidably mounted on the ramp 21.

The drive mechanism 27, which is structured to displace the sled mechanism 25 along the ramp 21, includes a motor mechanism 67 mounted on the sled mechanism 25 wherein the motor mechanism 67 includes a drive shaft 69. The drive mechanism 27 also includes a rack and pinion arrangement 71 wherein a rack 73 thereof is fixedly secured and arranged lengthwise along the ramp 21, and a spur gear or pinion 74 thereof is fixedly secured to the drive shaft 69 of the motor mechanism 67.

The drive mechanism 27 may also include a control mechanism 75 that is structured and configured to selectively activate and deactivate the motor mechanism 67, such as a double-pole, double-throw switch positioned in a corded control unit 76, for example. The drive mechanism 27 may also include limiting means 77 that is structured and configured to limit the extent to which the sled mechanism 25 is displaceable along the ramp 21. For example, the limiting means 77 may include a forward limiting mechanism 79, connected to the motor mechanism 67, that limits the extent to which the sled mechanism 25 is displaceable toward the front end 37 of the ramp 21. Similarly, the limiting means 77 may also include a rearward limiting mechanism 81, connected to the motor mechanism 67, that limits the extent to which the sled mechanism 25 is displaceable toward the rear end 39 of the ramp 21.

The clamping mechanism 29 is structured and configured to securely clamp a wheel 83 of the motorcycle 12 to the sled mechanism 25. The clamping mechanism 29 includes two opposing plates 84, 85 oriented generally vertically and spaced apart laterally from each other. The clamping mechanism 29 includes a manual clamping mechanism 86 wherein a first one 85 of the two opposing plates 84, 85 is fixedly secured to the sled mechanism 25. A displacer 87 is also fixedly secured to the sled mechanism 25, wherein the displacer 87 includes a handle 89 and an extendable portion 91 connected to the second one 84 of the two opposing plates 84, 85 such that rotation of the handle 89 causes the second one 84 of the opposing plates 84, 85 to be displaced toward or away from the first one 85 of the opposing plates 84, 85 such that the wheel 83 of the motorcycle 12 spaced therebetween is frictionally clampable, or releasable from being clamped, between the two opposing plates 84, 85.

Additionally, the sled mechanism 25 includes at least one pair of orifices 93 located on opposing sides of the sled mechanism 25, as indicated in FIG. 4. At least one hold-down strap 95, indicated by dashed lines in FIG. 4, releasably connected to the opposing pair of orifices 93 in order to stabilize the motorcycle 12 in an upright orientation and to center the motorcycle 12 relative to the sled mechanism 25 as the motorcycle 12 is being displaced along the ramp 21 and as the motorcycle 12 is being transported.

The power source 31 includes a battery 99 mounted on the sled mechanism 25, as indicated in FIG. 8.

The accessory 10 has a loading configuration 103 wherein the rear end 39 of the ramp 21 is spaced in close proximity to an underlying supporting surface 105 and the front end 37 of the ramp is elevated above the bed 16 of the transporting vehicle 14 to thereby form an inclined plane 106 between the front end 37 of the ramp 21 and the rear end 39 of the ramp 21. The accessory 10 also has a transporting configuration 107 wherein the ramp 21 is oriented substantially parallel to the bed 16 of the transporting vehicle 14. The accessory 10 is structured and configured to be displaceable to and from the loading configuration 103 and the transporting configuration 107 by the weight of a motorcycle 12 being displaced along the ramp 21.

In an application of the accessory 10 for loading and transporting a small vehicle of the present invention, the tailgate of the transporting vehicle 14 is removed. The pivot element 64 is mounted to the tailgate mounting mechanism 18 of the transporting vehicle 14. The main portion 43 of the ramp 21 is placed in the bed 16 of the transporting vehicle 14 wherein the main front end 45 of the main portion 43 is spaced in close proximity to the front end of the bed 16, such as approximately one inch rearwardly therefrom, for example.

Depending on the length of the bed 16 of the transporting vehicle 14, the pivot element 64 is secured to the main portion 43 of the ramp 21 with fasteners 123 through bores 125. For transporting vehicles 14 having long beds 16, however, it may be necessary to slide the center extension front end 55 endwise to abut the main rear end 47 and secure the center extension 54 and main portion 43 end-to-end with fasteners 127. The pivot element 64 is then secured to the center extension 54 with fasteners 123 through bores 125. More than one set of bores 125 may be provided in the main portion 43 and the center extension 54 for that purpose.

In the event that the pivot element 64 is securable to the main portion 43 as hereinbefore described, the center extension front end 55 is then slid endwise to abut the main rear end 47, with the center extension 54 then releasably secured end-to-end to main portion 43 with fasteners 127. The end extension front end 61 is then slid endwise to abut the center extension rear end 57, with the end extension 59 then releasably secured end-to-end to center extension 54 with fasteners 129.

The control mechanism 75, connected to power source 31, is used to activate the motor mechanism 67 causing the sled mechanism 25 to be displaced rearwardly along the ramp 21. When the center of gravity of the sled mechanism 25 is displaced rearwardly from the axis 20, the accessory 10 gravitationally tilts from the transporting configuration 107 to the loading configuration 103. When the sled mechanism 25 is displaced to near the end extension rear end 63, the rearward limiting mechanism 81 causes the motor mechanism 67 to be deactivated.

Figure 2:
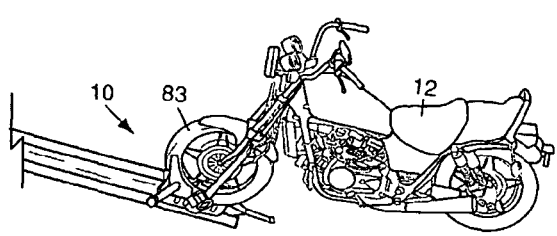
FIG. 2 is perspective view of the accessory for loading and transporting a motorcycle, showing an initial stage of loading the motorcycle on a transporting vehicle.

The motorcycle 12 is placed in neutral and a wheel 83 thereof is then rolled onto the sled mechanism 25, as shown in FIG. 2, such that the wheel 83 is spaced between the two opposing plates 84, 85 of the clamping mechanism 29. The handle 89 is used to force the opposing plates 84, 85 against opposing sides of the wheel 83 to thereby frictionally secure the wheel 83 to the sled mechanism 25.

Figure 3:
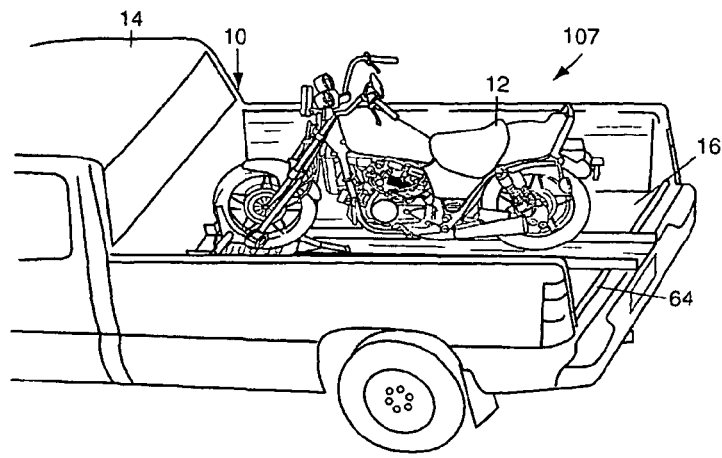
FIG. 3 is perspective view showing the accessory for loading and transporting a motorcycle in a transporting configuration.

The control mechanism 75 is then used to activate the motor mechanism 67 causing the sled mechanism 25 to be displaced forwardly along the ramp 21, as shown in FIG. 1. If needed, the motorcycle 12 may be manually stabilized in an upright orientation as the motorcycle 12 is being so displaced along the ramp 21. When the center of gravity of the motorcycle 12 is displaced forwardly from the axis 20, the accessory 10 with the motorcycle 12 thereon gravitationally tilts from the loading configuration 103 to the transporting configuration 107, as indicated in FIG. 3. When the sled mechanism 25 is displaced to near the main front end 45, the forward limiting mechanism 79 causes the motor mechanism 67 to be deactivated.

The end extension 59 and the center extension 54, if not connected to the pivot element 64, are then disconnected from the main portion 43 of the ramp 21, with the end extension 59 and the center extension 54 placed on the bed 16 of the transporting vehicle 14 or other suitable location. Stabilizing and securing means, such as tie-down straps, bungee cords, or other suitable means may be used as needed for the purpose of further stabilizing and securing the motorcycle 12 as the motorcycle 12 is being transported. The accessory 10 may include various orifices, hooks, etc., to accomplish such purposes.

The procedure for unloading a vehicle from the accessory 10 is essentially a reversal of the loading procedure hereinbefore described.

It is also to be understood that while certain forms of the present invention have been illustrated and described herein, it is not to be limited to the specific forms or arrangement of parts as described and shown.

What is claimed and desired to be covered by Letters Patent is as follows:

1. An accessory for transporting a motorcycle on a transporting vehicle having a bed and a tailgate mounting mechanism for pivotally mounting a tailgate about a transversely oriented horizontal axis, the accessory comprising:
   (a) a ramp having a front end and a rear end, the ramp including:
      (1) a main portion having a main front end and a main rear end, and
      (2) an extension portion having a extension front end and an extension rear end, wherein the extension portion is releasably securable to the main portion with the extension portion being oriented in an end-to-end relationship with the main portion;
   (b) a mounting mechanism structured and configured to pivotally mount the ramp to the tailgate mounting mechanism for rotation about the transversely oriented horizontal axis;
   (c) a sled mechanism slidably mounted to the ramp;
   (d) a drive mechanism structured to displace the sled mechanism along the ramp, the drive mechanism including a motor mechanism mounted on the sled mechanism;
   (e) a clamping mechanism structured and configured to releasably and securely clamp the vehicle to be transported to the sled mechanism; and
   (f) a power source configured to provide electrical energy to the motor mechanism; and
   (g) wherein the accessory has:
      (1) a loading configuration wherein the rear end of the ramp is spaced in close proximity to an underlying supporting surface and the front end is elevated above the bed of the transporting vehicle to thereby form an inclined plane between the front end of the ramp and the rear end of the ramp, and
      (2) a transporting configuration wherein the ramp is oriented substantially parallel to the bed of the transporting vehicle.

2. The accessory as described in claim 1, wherein the ramp has an upwardly opening C-shaped configuration extending from the front end to the rear end thereof.

3. The accessory as described in claim 1, wherein the extension portion includes:
   (a) a center extension having a center extension front end and a center extension rear end wherein the center extension is releasably securable to the main portion with the center extension being oriented in an end-to-end relationship with the main portion, and
   (b) an end extension having an end extension front end and an end extension rear end wherein the end extension is releasably securable to the center extension with the end extension being oriented in an end-to-end relationship with the center extension.

4. The accessory as described in claim 1, wherein the mounting mechanism includes a pivot element fixedly secured to an underside of the ramp.

5. The accessory as described in claim 1, wherein the drive mechanism includes a motor mechanism mounted on the sled mechanism.

6. The accessory as described in claim 5, wherein the drive mechanism includes:
   (a) the motor mechanism having a drive shaft; and
   (b) a rack and pinion arrangement wherein the rack is fixedly secured and arranged lengthwise along the ramp, and the pinion is fixedly secured to the drive shaft of the motor mechanism.

7. The accessory as described in claim 1, further includes a limiting mechanism structured and configured to limit the extent to which the sled mechanism is displaceable along the ramp.

8. The accessory as described in claim 7, wherein the limiting mechanism includes a forward limiting mechanism, connected to the motor mechanism, which limits the extent to which the sled mechanism is displaceable toward the front end of the ramp.

9. The accessory as described in claim 7, wherein the limiting mechanism includes a rearward limiting mechanism, connected to the motor mechanism, which limits the extent to which the sled mechanism is displaceable toward the rear end of the ramp.

10. The accessory as described in claim 1, wherein the clamping mechanism includes two opposing plates oriented generally vertically and spaced apart laterally from each other.

11. The accessory as described in claim 10, wherein the clamping mechanism includes a manual clamping mechanism having:
 (a) a first one of the two opposing plates fixedly secured to the sled mechanism;
 (b) a displacer fixedly secured to the sled mechanism, the displacer having a handle and an extendable portion connected to the second one of the two opposing plates; and
 (c) wherein rotation of the handle causes the second one of the two opposing plates to be displaced towards or away from the first one of the two opposing plates such that a wheel of the motorcycle spaced between the two opposing plates is frictionally clampable, or releasable from being clamped, between the two opposing plates.

12. The accessory as described in claim 1, wherein the power source includes a battery mounted on the sled mechanism.

13. An accessory for a transporting vehicle having a bed and a tailgate mounting mechanism for pivotally mounting a tailgate about a transversely oriented horizontal axis, the accessory comprising:
 (a) a ramp having a front end and a rear end wherein the ramp has an upwardly opening C-shaped configuration extending from the front end to the rear end, the ramp including:
  (1) a main portion having a main front end and a main rear end,
  (2) a center extension having a center extension front end and a center extension rear end wherein the center extension is releasably securable to the main portion with the center extension being oriented in an end-to-end relationship with the main portion, and
  (3) an end extension having an end extension front end and an end extension rear end wherein the end extension is releasably securable to the center extension with the end extension being oriented in an end-to-end relationship with the center extension;
 (b) a mounting mechanism structured and configured to pivotally mount the ramp to the tailgate mounting mechanism for rotation about the transversely oriented horizontal axis;
 (c) a sled mechanism slidably mounted on the ramp;
 (d) a drive mechanism structured to displace the sled mechanism along the ramp, the drive mechanism including:
  (1) a motor mechanism mounted on the sled mechanism, the motor mechanism including a drive shaft,
  (2) a rack and pinion arrangement wherein the rack is fixedly secured and arranged lengthwise along the ramp, and the pinion is fixedly secured to the drive shaft of the motor mechanism,
  (3) a control mechanism configured to selectively activate and deactivate the motor mechanism,
  (4) a forward limiting mechanism connected to the motor mechanism and limiting the extent to which the sled mechanism is displaceable toward the front end of the ramp, and
  (5) a rearward limiting mechanism connected to the motor mechanism and limiting the extent to which the sled mechanism is displaceable toward the rear end of the ramp;
 (e) a clamping mechanism structured and configured to securely clamp a wheel of a motorcycle to the sled mechanism; and
 (f) a power source configured to provide electrical energy to the control mechanism; and
 (g) wherein the accessory has:
  (1) a loading configuration wherein the rear end of the ramp is spaced in close proximity to an underlying supporting surface and the front end of the ramp is elevated above the bed of the transporting vehicle to thereby form an inclined plane between the front end of the ramp and the rear end of the ramp,
  (2) a transporting configuration wherein the ramp is oriented substantially parallel to the bed of the transporting vehicle, and wherein
  (3) the accessory is displaceable to and from the loading configuration and the transporting configuration by the weight of the motorcycle being displaced along the ramp.

* * * * *